United States Patent
Xie

(10) Patent No.: US 9,410,085 B2
(45) Date of Patent: Aug. 9, 2016

(54) LIQUID CRYSTAL BLEND, LIQUID CRYSTAL DISPLAY PANEL AND LIQUID CRYSTAL DISPLAY DEVICE

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/573,485

(22) Filed: Dec. 17, 2014

(65) Prior Publication Data

US 2016/0046865 A1 Feb. 18, 2016

(30) Foreign Application Priority Data

Aug. 18, 2014 (CN) .......................... 2014 1 0406436

(51) Int. Cl.
*C09K 19/34* (2006.01)
*C09K 19/02* (2006.01)
*C09K 19/20* (2006.01)
*C09K 19/30* (2006.01)
*C09K 19/04* (2006.01)

(52) U.S. Cl.
CPC ............. *C09K 19/3402* (2013.01); *C09K 19/02* (2013.01); *C09K 19/20* (2013.01); *C09K 19/3003* (2013.01); C09K 2019/0466 (2013.01); C09K 2019/3004 (2013.01); C09K 2019/3016 (2013.01); C09K 2019/3027 (2013.01); C09K 2019/3422 (2013.01)

(58) Field of Classification Search
CPC .............................................. C09K 2019/3422
USPC ..................................... 252/299.63; 3/299.63
See application file for complete search history.

(56) References Cited

U.S. PATENT DOCUMENTS

| 5,621,552 A * | 4/1997 | Coates ................. C09K 19/544 349/86 |
| 6,256,081 B1 | 7/2001 | Lee et al. |
| 2006/0158573 A1 | 7/2006 | Huh et al. |
| 2008/0204646 A1 | 8/2008 | Lim |
| 2013/0258222 A1 * | 10/2013 | Kim ..................... G02F 1/13439 349/33 |
| 2014/0111730 A1 * | 4/2014 | Goebel ..................... H04L 7/08 349/56 |
| 2015/0198855 A1 * | 7/2015 | Kim ........................ G02F 1/141 349/33 |

FOREIGN PATENT DOCUMENTS

| CN | 101270287 A | 9/2008 |
| CN | 103320142 A | 9/2013 |
| CN | 103364980 A | 10/2013 |
| CN | 103443695 A | 12/2013 |
| CN | 103740377 A | 4/2014 |
| JP | 2007-314795 A | 12/2007 |

OTHER PUBLICATIONS

2nd Office Action issued Chinese application No. 201410406436.0 issued Nov. 26, 2015.
1st Office Action issued Chinese application No. 201410406436.0 issued Jul. 2, 2015.

* cited by examiner

*Primary Examiner* — Chanceity Robinson
(74) *Attorney, Agent, or Firm* — Nath, Goldberg & Meyer; Joshua B. Goldberg

(57) ABSTRACT

The present invention provides a liquid crystal blend having a higher perpendicular dielectric constant, as well as a liquid crystal display panel and a liquid crystal display device comprising the liquid crystal blend. Since the liquid crystal blend of the present invention contains negative liquid crystal material and has a perpendicular dielectric constant between 3.5 to 4.5, it can improve the transmittance of the liquid crystal layer obtained thereby, compared with the liquid crystal blend without negative liquid crystal material, while other relative properties thereof such as clearing point, response time of the display obtained therefrom, and image sticking at high temperature can also meet the requirements of liquid crystal devices.

9 Claims, No Drawings

LIQUID CRYSTAL BLEND, LIQUID CRYSTAL DISPLAY PANEL AND LIQUID CRYSTAL DISPLAY DEVICE

FIELD OF THE INVENTION

The present invention relates to the technical field of display manufacturing. Particularly, the present invention relates to a liquid crystal blend, as well as a liquid crystal display panel and a liquid crystal display device comprising the liquid crystal blend.

BACKGROUND OF THE INVENTION

Liquid crystal is a phase between conventional liquid phase and solid crystalline phase, and the matters in such phase has been widely used in thin type display from the middle of the 20th century due to its physical, chemical and optical characteristics. Liquid crystal phase can only be generated by a combination of molecules having special shapes, which may flow like a liquid but also have optical properties of crystal. Recently, the definition of liquid crystal has expanded to cover all matters that can be in liquid crystal phase at a certain range of temperature while being normal crystal in a relatively low temperature. Liquid crystal may be one organic compound, or a composition combined by the intermolecular forces. Liquid crystal have special optical properties and are sensitive to electromagnetic fields, therefore they are of extremely high practical value.

Liquid crystal display materials have obvious advantages as follows: low driving voltage, low power consumption, high reliability, the ability to display more information, full-color, free of flicker, no harm to human body, automatic production, low cost, being useful for variety of sizes and types of liquid crystal display (LCD), easy to carry and the like. Due to these advantages, the sizes of computer terminals and televisions manufactured with these materials may be significantly reduced.

Dielectric anisotropy is the main parameter of a liquid crystal determining the behavior of the liquid crystal molecules in an electric field, if the dielectric constant in the direction parallel to the alignment of a liquid crystal (hereinafter simply referred as "parallel dielectric constant") is expressed as $\in_\parallel$ and the dielectric constant in the direction perpendicular to the alignment of a liquid crystal (hereinafter simply referred as "perpendicular dielectric constant") is expressed as $\in_\perp$, the dielectric anisotropy can be expressed as $\Delta\in=\in_\parallel-\in_\perp$. When $\Delta\in>0$, the liquid crystal is called positive liquid crystal, otherwise a negative liquid crystal.

In prior art, liquid crystal layer of a LCD generally employs positive liquid crystal. Since the positive liquid crystal has small $\in_\perp$, resulting in a large incline angle between the liquid crystal molecule and the display panel, which is unfavorable for the rotation of the liquid crystal molecule in the plane parallel to the display panel, therefore, transmittance of the LCD comprising such liquid crystal layer is low.

SUMMARY OF THE INVENTION

The object of the present invention is to provide a liquid crystal blend having a higher perpendicular dielectric constant, as well as a liquid crystal display panel and a LCD device comprising the liquid crystal blend, so as to solve the problem that the liquid crystal material in prior art has a relatively low perpendicular dielectric constant, causing the liquid crystal display panels comprising such material have relatively low transmittance.

In one aspect, the present invention provides a liquid crystal blend comprising positive liquid crystal material and negative liquid crystal material, wherein the liquid crystal blend has a perpendicular dielectric constant in a range of 3.5-4.5.

Preferably, the mass ratio of the positive liquid crystal material to the negative liquid crystal material is 7:1 to 2:1 (positive liquid crystal material:negative liquid crystal material).

Preferably, the liquid crystal blend further comprises neutral liquid crystal material. The mass of the neutral liquid crystal material may be 30% to 50% of the total mass of the liquid crystal blend.

In another aspect, the present invention provides a liquid crystal display panel comprising a liquid crystal layer which is prepared by the above-described liquid crystal blend.

In yet another aspect, the present invention provides a liquid crystal display device comprising the above-described liquid crystal display panel.

Since the liquid crystal blend of the present invention contains negative liquid crystal material and has a perpendicular dielectric constant between 3.5 to 4.5, it can improve the transmittance of the liquid crystal layer obtained thereby, compared with the liquid crystal blend without negative liquid crystal material; meanwhile, other relative properties thereof such as clearing point, response time of the display obtained from the liquid crystal blend, image sticking at high temperature can also satisfy the requirements of liquid crystal devices.

DETAILED DESCRIPTION OF CERTAIN EMBODIMENTS

The present invention will be described in further detail with reference to the following embodiments, so that a person skilled in the art can get a better understanding of the technical solutions of the invention.

An embodiment of the present invention provides a liquid crystal blend comprising positive liquid crystal material and negative liquid crystal material, wherein the liquid crystal blend has a perpendicular dielectric constant in a range of 3.5-4.5.

Preferably, the mass ratio of the positive liquid crystal material to the negative liquid crystal material is 7:1 to 2:1 (positive liquid crystal material:negative liquid crystal material).

Preferably, the mass ratio of the positive liquid crystal material to the negative liquid crystal material is 4:1 to 2:1. The liquid crystal blend having mass ratio in such range will result in a significantly improved transmittance, while keeping other parameters thereof (e.g. refractive index, the clearing point and the like) suitable for the liquid crystal layer of a display panel. If the mass ratio is too high, the perpendicular dielectric constant of the liquid crystal blend will be reduced, thereby reducing the transmittance of the liquid crystal layer obtained. If the mass ratio is too low, the response speed of the obtained display panel will be too slow.

Preferably, the mass ratio of the positive liquid crystal material to the negative liquid crystal material is 2:1; the perpendicular dielectric constant of the liquid crystal blend is 4.5.

Preferably, the liquid crystal blend further comprises neutral liquid crystal material. The mass of the neutral liquid crystal material may be 30% to 50% of the total mass of the liquid crystal blend. Said neutral liquid crystal material is mainly used for adjusting the viscosity of the liquid crystal blend.

The negative liquid crystal material may be any negative liquid crystal material that can be used in liquid crystal display. Preferably, the negative liquid crystal material may be selected from any one or more of the following:

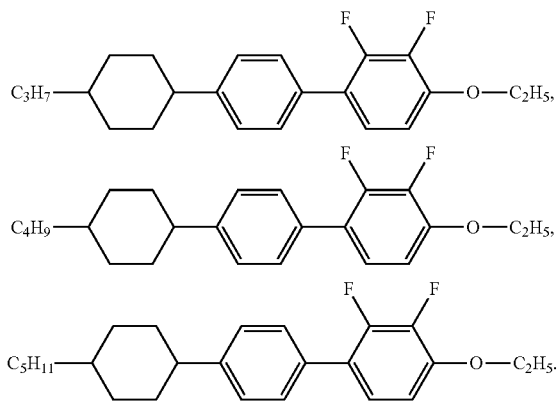

The positive liquid crystal material may be any positive liquid crystal material that can be used in liquid crystal display. Preferably, the positive liquid crystal material may be selected from any one or more of the following:

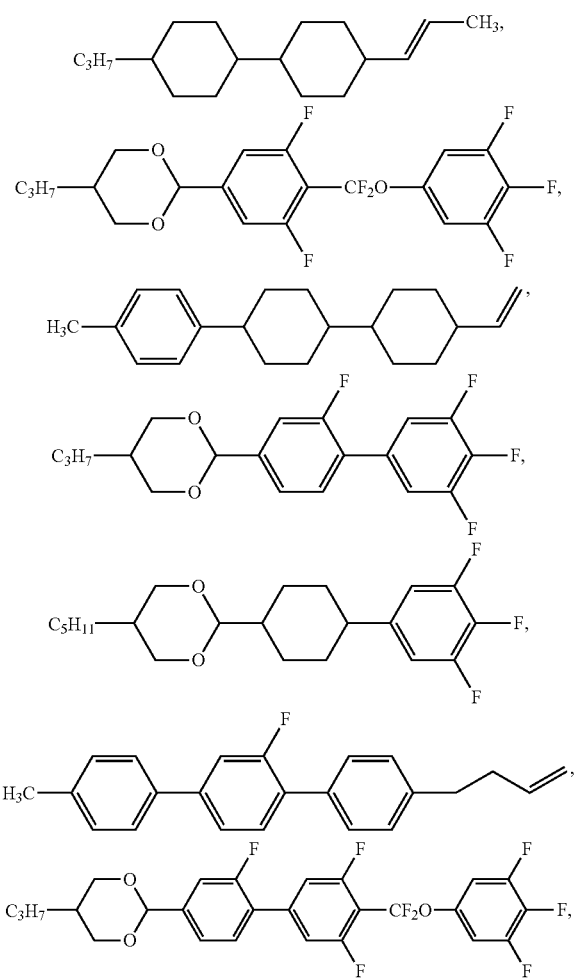

-continued

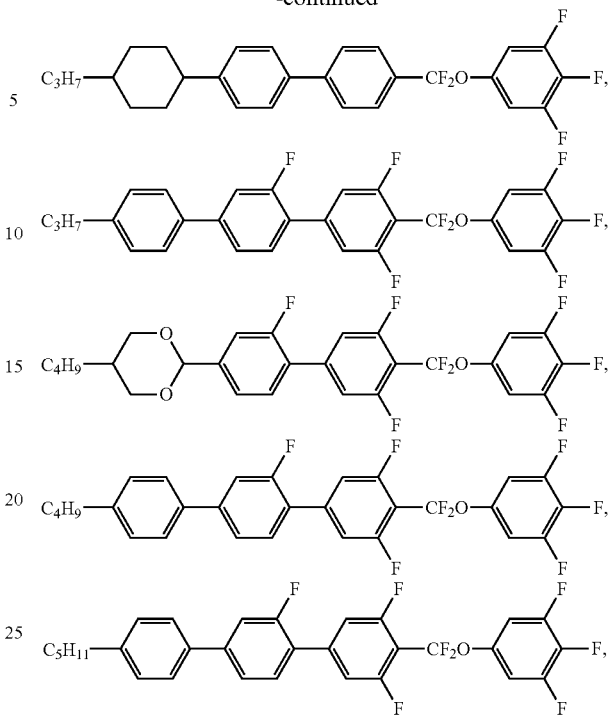

The neutral liquid crystal material may be any neutral liquid crystal material that can be used in liquid crystal display. Preferably, the neutral liquid crystal material may be selected from any one or two of the following:

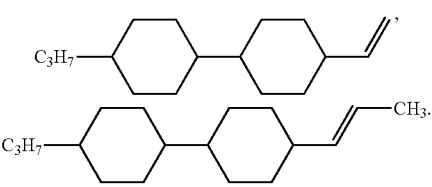

Another embodiment of the present invention provides a liquid crystal display panel comprising a liquid crystal layer which is prepared from the above-described liquid crystal blend having a perpendicular dielectric constant in a range of 3.5-4.5.

Yet another embodiment of the present invention provides a liquid crystal display device comprising the above-described liquid crystal display panel.

EXAMPLES

Comparative Example

This comparative example provides a liquid crystal blend comprising a positive liquid crystal material and a neutral liquid crystal material, and the specific liquid crystal components and the mass percentage thereof are shown in Table 1 and Table 2.

Examples 1-5

Examples 1-5 each provides a liquid crystal blend comprising a positive liquid crystal material, a neutral liquid crystal material and a negative liquid crystal material. The specific liquid crystal components, the mass percentage thereof, and the mass ratio of the positive liquid crystal material to the negative liquid crystal material (simply referred to as Mass Ratio in Table 2) are shown in Table 1 and Table 2.

TABLE 1

| No. of the LC molecule | Formula of the LC molecule | Polarity of the LC molecule |
|---|---|---|
| 1 | 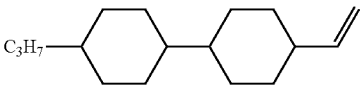 | Neutral |
| 2 | 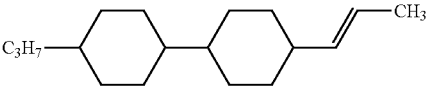 | Neutral |
| 3 | 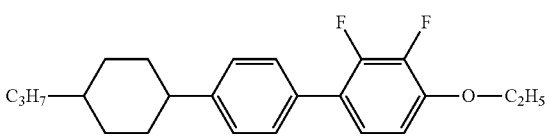 | Negative |
| 4 | 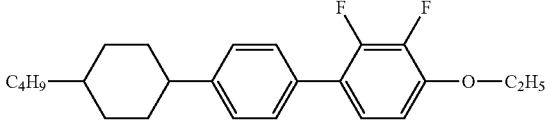 | Negative |
| 5 | 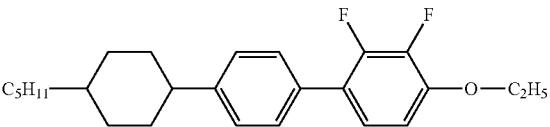 | Negative |
| 6 | 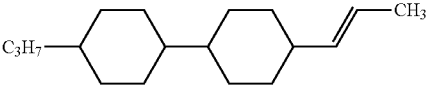 | Positive |
| 7 | 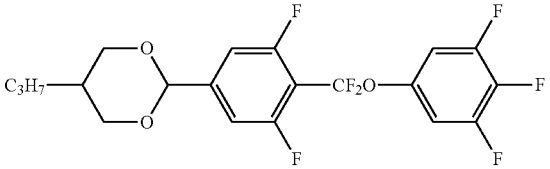 | Positive |
| 8 |  | Positive |
| 9 | 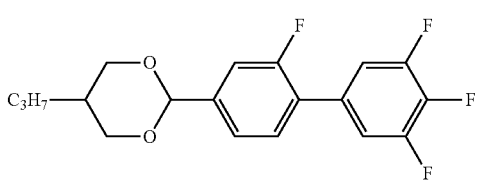 | Positive |
| 10 | 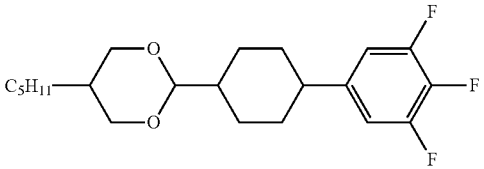 | Positive |

TABLE 1-continued
Liquid Crystal Material Used in Examples and Comparative Example
| No. of the LC molecule | Formula of the LC molecule | Polarity of the LC molecule |
|---|---|---|
| 11 | 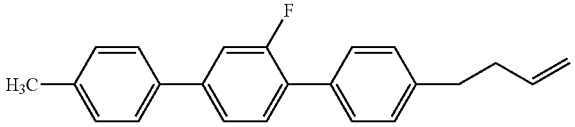 [SMILES: C=CCCc1ccc(-c2ccc(-c3ccc(C)cc3)cc2F)cc1] | Positive |
| 12 | 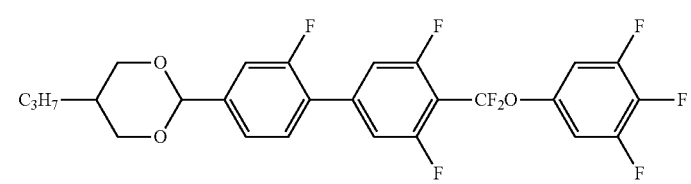 | Positive |
| 13 | 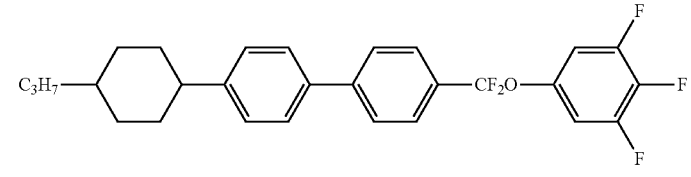 | Positive |
| 14 | 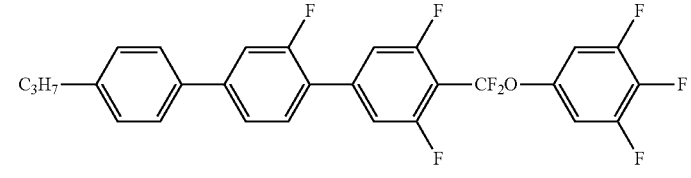 | Positive |
| 15 | 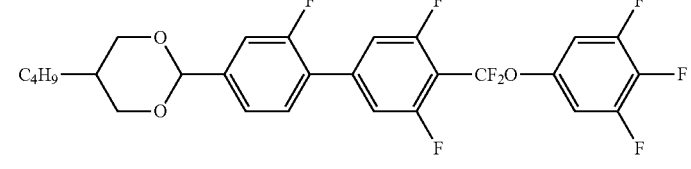 | Positive |
| 16 | 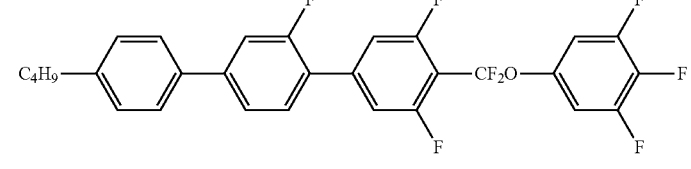 | Positive |
| 17 | 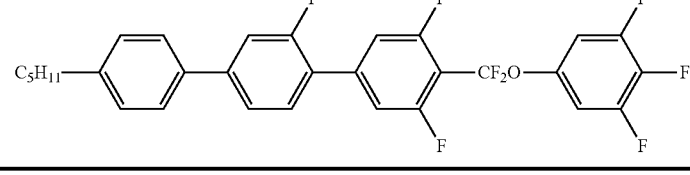 | Positive |
TABLE 2
| No./mass percentage (%) | Comp. Exam. | Exam. 1 | Exam. 2 | Exam. 3 | Exam. 4 | Exam. 5 |
|---|---|---|---|---|---|---|
| 1 | 28 | 43.62 | 23 | 0 | 28.97 | 20.07 |
| 2 |  | 0 | 22 | 39.19 | 20 | 15 |
| 3 |  | 3.2 | 5 | 6 | 6 | 13 |
| 4 |  | 2 | 3 | 4 | 5.5 | 9 |
| 5 |  | 1.84 | 3 | 5 | 5.5 | 9 |
| 6 | 12 | 4.5 | 3.1 | 3.5 | 3.2 | 3.1 |
| 7 | 5 | 4.65 | 4.9 | 4.8 | 3.5 | 3.5 |
| 8 | 15 | 12.79 | 8 | 14 | 8 | 8.2 |
| 9 | 8 | 5.65 | 3 | 3.6 | 3.1 | 3.2 |
| 10 | 1 | 0.1 | 1 | 0.08 | 0.1 | 0.1 |
| 11 | 4 | 2.25 | 4 | 1.5 | 1.5 | 1.1 |
| 12 | 3 | 1.44 | 3 | 2.18 | 1.44 | 1.44 |
| 13 | 5 | 4.88 | 3 | 4.1 | 3.5 | 35 |
| 14 | 3 | 1.41 | 1 | 2.8 | 1.19 | 1.19 |

TABLE 2-continued

| No./mass percentage (%) | Comp. Exam. | Exam. 1 | Exam. 2 | Exam. 3 | Exam. 4 | Exam. 5 |
|---|---|---|---|---|---|---|
| 15 | 3 | 2.2 | 2 | 2.9 | 2.2 | 2.2 |
| 16 | 8 | 5.15 | 6 | 3.15 | 3.1 | 3.2 |
| 17 | 5 | 4.32 | 5 | 3.2 | 3.2 | 3.2 |
| Mass Ratio | No positive Liquid crystal | 7:1 | 4:1 | 3:1 | 2:1 | 12:11 |

The liquid crystal blends of examples 1-5 and the comparative example were subjected to the following tests respectively:

1. Clearing Point Test

The clearing point of the liquid crystal blends are measured by a differential thermal analyzer.

2. Dielectric Constant and Perpendicular Dielectric Constant Test

The dielectric constant and perpendicular dielectric constant are measured under a electric field by a precision LCR meter as follows: first measuring the capacitance Co between the two counter electrode, then measuring the $C_\parallel$ when the alignment of the liquid crystal under the electric field is parallel to the direction of the electric field, and measuring the $C_\perp$ when the alignment of the liquid crystal under the electric field is perpendicular to the direction of the electric field. The $\in_\parallel$ and $\in_\perp$ are calculated according to the following equation:

$$\left.\begin{array}{l} C_0 = \varepsilon_0 \dfrac{S}{d} \\ C_{LC} = \varepsilon_0 \varepsilon_{LC} \dfrac{S}{d} \end{array}\right\} \Rightarrow \dfrac{C_{LC}}{C_0} = \varepsilon_{LC},$$

wherein S is the electrode area;

d is the thickness of the liquid crystal blend;

$C_{LC}$ is the capacitance of the liquid crystal blend, representing $C_\parallel$ and $C_\perp$;

$\in_{LC}$ is the dielectric constant of the liquid crystal blend, representing $\in_\parallel$ and $\in_\perp$.

In addition, $\Delta\in = \in_\parallel - \in_\perp$.

3. Enhancement of the transmittance of the liquid crystal blend relative to the positive liquid crystal (%)

The transmittances of the liquid crystal blends are measured by a LCD V–T (applied voltage–light transmittance) test equipment.

4. Response Time Test

The response time are measured by a LCD response time test equipment.

5. Refractive Index Test

The refractive index is measured by an Abbe refractometer.

6. Rotary Viscosity Test

The rotary viscosity is measured by a Brookfiled viscometer.

7. Gray scale during the disappearing of the image sticking at high temperature

The gray scale during the disappearing of the image sticking at high temperature (hereinafter simply referred to as gray scale) are measured by a LCD reliability test equipment at 1 h, 3 h, 5 h, 7 h, 8 h, 24 h, 48 h, 72 h, 96 h and 168 h respectively.

The results of the above tests are shown in Table 3.

TABLE 3

Test results of the liquid crystal blends in examples and comparative example

| | Comp. Exam. | Exam. 1 | Exam. 2 | Exam. 3 | Exam. 4 | Exam. 5 |
|---|---|---|---|---|---|---|
| Mass Ratio | No positive Liquid crystal | 7:1 | 4:1 | 3:1 | 2:1 | 12:11 |
| Clearing Point (° C.) | 85 | 82 | 81 | 82 | 83 | 71 |
| Perpendicular dielectric constant ($\in_\perp$) | 3.2 | 3.5 | 3.9 | 4.1 | 4.5 | 5 |
| Dielectric Constant ($\Delta\in$) | 8.7 | 8.7 | 7.9 | 7.8 | 7.7 | 7 |
| Refractive Index ($\Delta n$) | 0.0992 | 0.1 | 0.1 | 0.1 | 0.1 | 0.1 |
| Rotary Viscosity | 81 | 82 | 85.3 | 87.5 | 89.6 | 93.5 |
| Enhancement of the transmittance | reference value | 1.52 | 3.08 | 4.12 | 5.42 | 8.21 |
| Reponses Time (ms) | 27.4 | 28.6 | 30.1 | 31.2 | 31.8 | 36.4 |
| Gray Scale (relative to positive liquid crystal) | reference value | attain to reference value | attain to reference value | attain to reference value | attain to reference value | below reference value |

As shown in Table 3, since the negative liquid crystal material have a larger perpendicular dielectric constant, the liquid crystal blends of Examples 1-5 which comprise different proportions of negative liquid crystal material have a larger perpendicular dielectric constant, which makes the liquid crystal molecules form a smaller incline angle with the display panel, i.e. the liquid crystal molecules being more parallel to the display panel and thus being much easier to rotate in plane, thereby resulting in a higher transmittance of the obtained LCD. For Examples 1-4, perpendicular dielectric constants of the liquid crystal blends is in a range of 3.5-4.5, and the transmittance can be enhanced by 1.52%-5% compared with the positive liquid crystal (Comparative Example), while the response time are less than 33 ms, and reliability test results are normal. All of these properties satisfy the requirements of a LCD.

In addition, it can be seen from Table 1-3 that, when the perpendicular dielectric constant of the liquid crystal blend reaches 5.0 (such as Example 5, the mass ratio of the positive and negative liquid crystal being 12:11), the response time slightly slows to 36.4 ms; and the level of image sticking at high temperature is low than that of the positive LC, meanwhile, the clearing point thereof is lower (71° C.). Therefore, there is a risk to use such liquid crystal blend for LCDs.

It is understood that the present invention is not limited to the above-illustrated embodiments, which were chosen and described in order to best explain the principles of the invention. Those skilled in the art can make various modifications or variations without departing from the spirit and essence of the present invention. It is intended that the scope of the invention be defined by the following claims and their equivalents.

The invention claimed is:

1. A liquid crystal blend, characterized by comprising positive liquid crystal material and negative liquid crystal material, wherein the liquid crystal blend has a perpendicular dielectric constant in a range of 3.5-4.5, and the mass ratio of the positive liquid crystal material to the negative liquid crystal material is 7:1 to 2:1.

2. The liquid crystal blend according to claim 1, characterized in that, the mass ratio of the positive liquid crystal material to the negative liquid crystal material is 4:1 to 2:1.

3. The liquid crystal blend according to claim 2, characterized in that the mass ratio of the positive liquid crystal material to the negative liquid crystal material is 2:1, and the perpendicular dielectric constant of the liquid crystal blend is 4.5.

4. The liquid crystal blend according to claim 1, characterized in that the liquid crystal blend further comprises neutral liquid crystal material and the mass of the neutral liquid crystal material is 30% to 50% of the total mass of the liquid crystal blend.

5. The liquid crystal blend according to claim 1, characterized in that the negative liquid crystal material is selected from any one or more of the following:

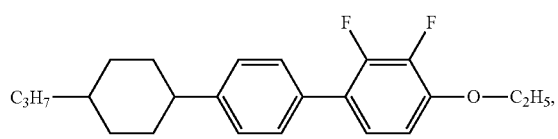

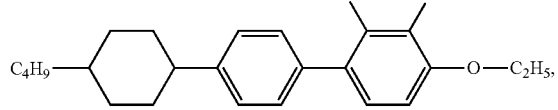

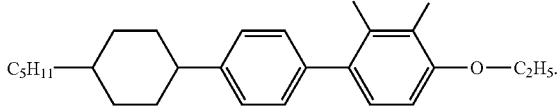

6. The liquid crystal blend according to claim 1, characterized in that the positive liquid crystal material is selected from any one or more of the following:

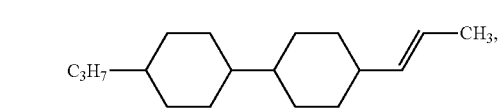

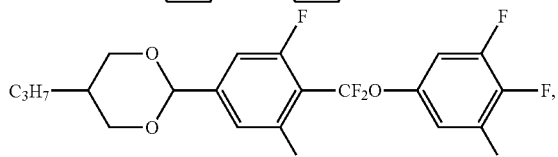

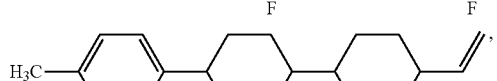

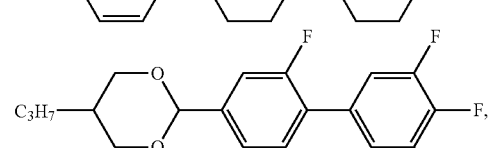

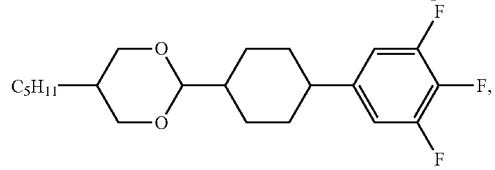

-continued

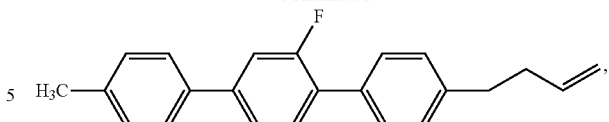

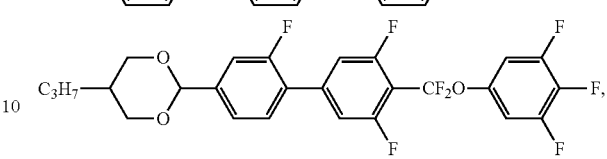

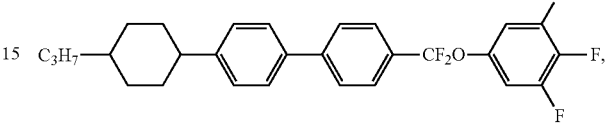

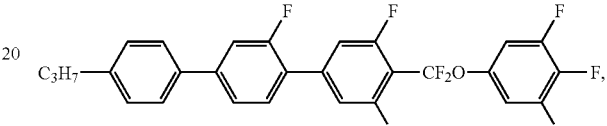

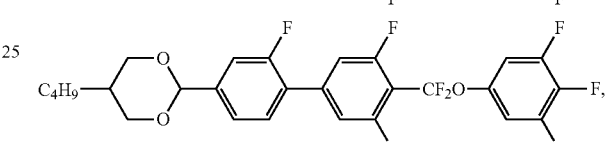

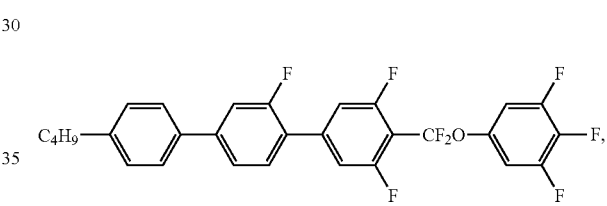

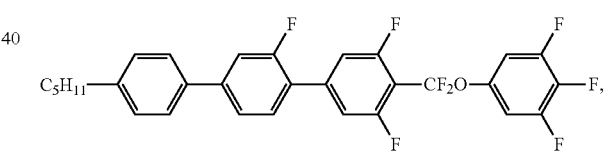

7. The liquid crystal blend according to claim 4, characterized in that the neutral liquid crystal material is selected from any one or two of the following:

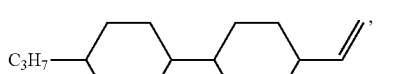

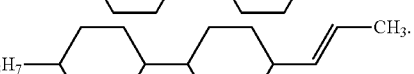

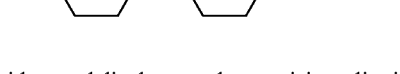

8. A liquid crystal display panel comprising a liquid crystal layer, characterized in that the liquid crystal layer comprises a liquid crystal blend comprising positive liquid crystal material and negative liquid crystal material, wherein the liquid crystal blend has a perpendicular dielectric constant in a range of 3.5-4.5, and a mass ratio of the positive liquid crystal material to the negative liquid crystal material is 7:1 to 2:1.

9. A liquid crystal display device, characterized in comprising a liquid crystal display panel having a liquid crystal layer which comprises a liquid crystal blend comprising positive liquid crystal material and negative liquid crystal material, wherein the liquid crystal blend has a perpendicular dielectric constant in a range of 3.5-4.5, and the mass ratio of the positive liquid crystal material to the negative crystal material is 7:1 to 2:1.

* * * * *